H. W. SPENCER.
STEAM SEPARATOR.
APPLICATION FILED FEB. 27, 1909.
961,037.
Patented June 7, 1910.
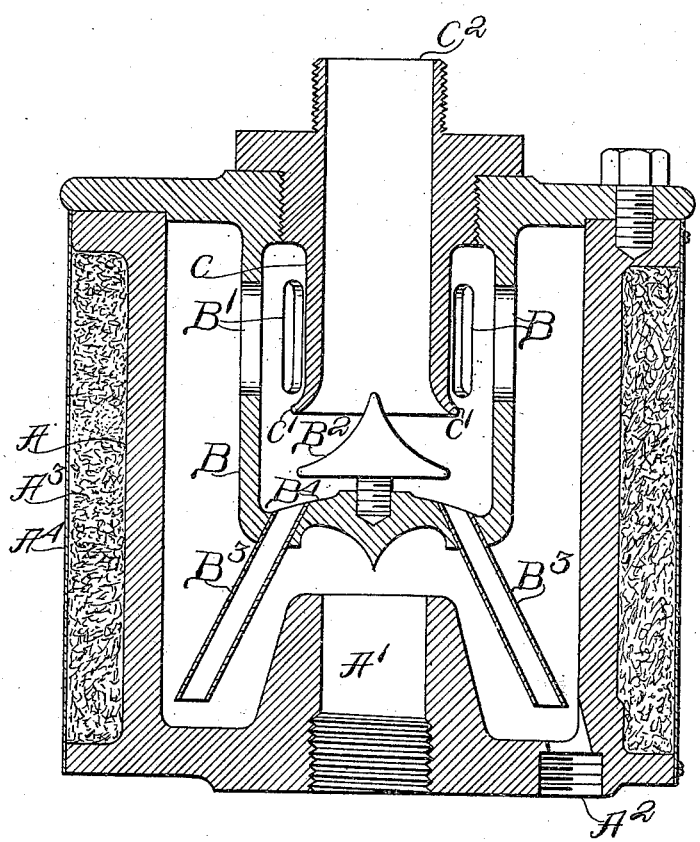

UNITED STATES PATENT OFFICE.

HENRY W. SPENCER, OF LONDON, ENGLAND.

STEAM-SEPARATOR.

961,037.     Specification of Letters Patent.     Patented June 7, 1910.

Application filed February 27, 1909. Serial No. 480,484.

*To all whom it may concern:*

Be it known that I, HENRY W. SPENCER, a British subject, residing at London, England, have invented certain new and useful Improvements in Steam-Separators, of which the following is a specification.

My invention relates to steam separators and its object is to provide means for thoroughly separating and eliminating from steam all the water and oil that may be held in suspension by the steam or condensed from the steam in its passage from the boiler to an engine, or elsewhere. This object is accomplished by causing the steam to be frequently deflected in its course or by giving to it a whirling motion, and I accomplish this purpose by forming and arranging the parts of the separator as hereinafter described.

I will describe my device as applied to steam whistles, though it is applicable and adaptable in all cases where it is desired to employ a steam separator.

The pipes of steam whistles have heretofore been provided with drain pipes or equivalent devices for draining therefrom by gravity the water accumulated therein, but, while such devices are efficient for emptying the steam whistle pipes of any water, they are ineffective for the purpose of continuously separating and removing the water contained in and carried by the steam through the pipes to the whistle. In the numerous cases where the steam contains an appreciable percentage of water such water-charged steam has no action, or no immediate action, on the steam whistle and no sound is emitted thereby, or the sounding is delayed for some little time after the admission of the steam to the whistle, and serious accidents frequently result. Such disadvantages are obviated by this invention.

A vertical section of this invention is shown in the accompanying drawing.

The apparatus consists of three concentrically arranged cylindrical vessels A, B, C, the outermost A of which is a closed chamber provided at the lower part with a steam inlet $A^1$ by which it is attached to the upper end of the steam whistle pipe (not shown in the drawing). The intermediate vessel B is also a closed chamber and is provided at or near to its upper end with any suitable number of vertically arranged slots or apertures $B^1$ to allow the steam to pass therethrough from the outer vessel A. Centrally arranged on the bottom $B^4$ of the intermediate vessel B and beneath the open mouth of the inner vessel C is a double conical or conoidal base or abutment $B^2$. The inner vessel C projects downward in the intermediate vessel B below the steam apertures $B^1$ therein and is provided with an open bottom which is flared outward as shown at $C^1$. This inner vessel is provided with a steam outlet $C^2$ to which the steam whistle is secured. The intermediate vessel B is further provided with pipes $B^3$ for conveying and discharging the separated water from the vessel B into the lower part or base of the outer vessel A, and the said outer vessel is provided with a connection $A^2$ for a pipe for leading the separated water to a steam trap or other receptacle. The outer vessel A is preferably lagged with a suitable non-conducting material $A^3$ which is kept in place by a metallic sheathing $A^4$.

The action of the apparatus is as follows: The steam admitted to the outer vessel A through the inlet $A^1$ strikes against the underside of the bottom $B^4$ of the intermediate vessel B and passes up the outside thereof and enters the interior through the vertically arranged slots $B^1$ at or near the upper end, it then impinges on the exterior surface of the inner vessel C. The outwardly flared mouth $C^1$ of the inner vessel causes the steam to strike against the interior of the intermediate vessel B whence it rebounds to the central double conical or conoidal base or abutment $B^2$. By this abutment the steam is directed upward through the inner vessel C to the steam whistle without eddying or whirling and consequent irregularity of flow.

By the continuous separation of the water from the steam in the manner described the steam admitted to the apparatus will pass in a substantially dry state to the whistle.

Obviously the invention can be applied to existing steam whistle pipes provided with gravity water draining devices, as the invention will separate any condensed water present, or formed, in the steam during its upward passage through the pipes to the whistle.

As a modification the inner vessel C may be closed at the bottom and provided with vertically arranged steam admission apertures non-coincident with those in the intermediate vessel and provided with drain pipes or drain holes to pass the separated water to the intermediate vessel.

Claims:

1. A steam separator comprising three concentrically arranged cylindrical chambers, the outer chamber having a closed bottom with a steam inlet, the inner chamber having an outwardly flared open bottom and a steam outlet at its upper end, the intermediate chamber having a closed bottom, a double conical or conoidal abutment centrally arranged thereon and steam admission apertures near its upper end, said intermediate and outer vessels being furnished with water draining pipes; substantially as described.

2. A separator comprising an outer chamber having an opening in its bottom for the admission of steam and another opening therein for the escape of water, an intermediate chamber furnished with openings into said outer chamber for the admission of steam, other openings into said outer chamber for the escape of water and furnished with a conical abutment, and an inner chamber with a flared bottom opening into said intermediate chamber above said conical abutment and having an outlet at its upper end for the escape of steam; substantially as described.

3. A steam separator comprising an outer chamber having a steam inlet and a water outlet, an intermediate chamber in the upper part of said outer chamber and communicating therewith by steam passages; and an inner chamber in the upper part of said intermediate chamber and communicating therewith by steam passages, said inner chamber having a steam outlet and said intermediate and inner chambers, or either of them, having a water outlet; substantially as described.

4. A steam separator comprising an outer chamber having a steam inlet and a water outlet, an intermediate chamber in the upper part of said outer chamber and communicating therewith by steam passages; and an inner chamber in the upper part of said intermediate chamber and communicating therewith by steam passages, said inner chamber having a steam outlet; substantially as described.

In testimony whereof I have affixed my signature, in presence of two witnesses.

HENRY W. SPENCER.

Witnesses:
H. D. JAMESON,
HAROLD EDRIC STEPHEN.